United States Patent
Wada

(10) Patent No.: US 11,814,102 B2
(45) Date of Patent: Nov. 14, 2023

(54) VEHICLE FRONT STRUCTURE

(71) Applicant: SUBARU CORPORATION, Tokyo (JP)

(72) Inventor: Yoshio Wada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/840,173

(22) Filed: Jun. 14, 2022

(65) Prior Publication Data

US 2023/0011202 A1 Jan. 12, 2023

(30) Foreign Application Priority Data

Jul. 9, 2021 (JP) ................................. 2021-114364

(51) Int. Cl.
*B60R 19/18* (2006.01)
*B60R 19/34* (2006.01)
*B62D 21/11* (2006.01)
*B62D 21/15* (2006.01)

(52) U.S. Cl.
CPC ............ *B62D 21/152* (2013.01); *B60R 19/34* (2013.01); *B62D 21/11* (2013.01)

(58) Field of Classification Search
CPC .... B62D 21/152; B62D 21/11; B62D 25/082; B60R 19/02; B60R 19/12; B60R 19/18; B60R 2019/1806; B60R 19/26; B60R 19/34; F16D 49/00
See application file for complete search history.

(56) References Cited

U.S. PATENT DOCUMENTS

| | | | | |
|---|---|---|---|---|
| 2003/0085592 A1* | 5/2003 | Seksaria | ................. | B60K 5/12 296/193.09 |
| 2018/0281517 A1* | 10/2018 | Gordon | .................... | B60G 3/14 |
| 2021/0086835 A1 | 3/2021 | Serada et al. | | |
| 2021/0331640 A1* | 10/2021 | Iwamoto | ................. | B60R 19/26 |
| 2022/0153352 A1* | 5/2022 | Mukaigawa | ......... | B62D 25/085 |

FOREIGN PATENT DOCUMENTS

| | | | |
|---|---|---|---|
| JP | 2015137080 A | * | 7/2015 |
| JP | 2021-054389 A | | 4/2021 |
| JP | 2023013303 A | * | 1/2023 |

* cited by examiner

*Primary Examiner* — Karen Beck
*Assistant Examiner* — Daniel M. Keck
(74) *Attorney, Agent, or Firm* — McGinn I.P. Law Group, PLLC

(57) ABSTRACT

A vehicle front structure includes side frames in pairs, a bumper beam, a pair of lower frames, a lower beam, and wheels in pairs. Each of outer end parts of the bumper beam in a vehicle width direction and a corresponding one of outer end parts of the lower beam in the vehicle width direction overlap a corresponding one of the wheels as seen from the vehicle front side. In the vehicle width direction, a position of each of vehicle-width-direction outer ends of the bumper beam and a position of a corresponding one of vehicle-width-direction outer ends of the lower beam substantially coincide with a position of a mounting part of a corresponding one of brake devices that are disposed radially inside the wheels respectively.

20 Claims, 5 Drawing Sheets

VEHICLE FRONT STRUCTURE

CROSS-REFERENCE TO RELATED APPLICATIONS

The present application claims priority from Japanese Patent Application No. 2021-114364 filed on Jul. 9, 2021, the entire contents of which are hereby incorporated by reference.

BACKGROUND

The disclosure relates to a vehicle front structure.

A vehicle body that is disclosed in Japanese Unexamined Patent Application Publication No. 2021-54389 has a front structure in which a bumper beam is extended in a vehicle width direction at a front end part of a vehicle. The bumper beam is supported by side frames that are on a vehicle rear side of the bumper beam. In addition, a lower beam is extended in the vehicle width direction under the bumper beam, and the lower beam is supported by subframes that are on vehicle rear side of the lower beam. With this structure, for example, at the time the vehicle has a frontal collision, reaction forces are applied to a collision object (opposing vehicle) from the bumper beam and the lower beam. This prevents the reaction forces from acting locally on the opposing vehicle. Thus, it is possible to reduce the possibility of damaging the collision object (opposing vehicle) at the time of the frontal collision.

SUMMARY

An aspect of the disclosure provides a vehicle front structure including side frames in pairs, a bumper beam, lower frames in pairs, a lower beam, and wheels in pairs. The side frames are disposed respectively on both sides of a front part of a vehicle in a vehicle width direction of the vehicle. The side frames extend in a vehicle front-rear direction of the vehicle. The bumper beam extends in the vehicle width direction. The bumper beam is coupled to respective vehicle front end parts of the side frames. Both outer end parts of the bumper beam in the vehicle width direction are disposed outward in the vehicle width direction as seen from the side frames. The lower frames extend in the vehicle front-rear direction on the both sides of the front part in the vehicle width direction. The lower frames are disposed under the side frames. The lower beam extends in the vehicle width direction on a vehicle lower side of the bumper beam. The lower beam is coupled to respective front end parts of the lower frames. Both outer end parts of the lower beam in the vehicle width direction are disposed outward in the vehicle width direction as seen from the lower frames. The wheels are disposed on an outer side of the side frames in the vehicle width direction and an outer side of the lower frames in the vehicle width direction. Each of the outer end parts of the bumper beam and a corresponding one of the outer end parts of the lower beam are disposed on a vehicle front side of a corresponding one of the wheels and overlap the corresponding one of the wheels as seen from the vehicle front side. In the vehicle width direction, a position of each of vehicle-width-direction outer ends of the bumper beam and a position of a corresponding one of vehicle-width-direction outer ends of the lower beam substantially coincide with a position of a mounting part of a corresponding one of brake devices that are disposed radially inside the wheels respectively.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The above-described front structure of the vehicle body has room for improvement in the following points. That is, the vehicle-width-direction outer end part of the bumper beam protrudes outward in the vehicle width direction from the side frame, and the vehicle-width-direction outer end part of the lower beam protrudes outward in the vehicle width direction from the subframe. In these conditions, for example, at the time the vehicle has an offset frontal collision, reaction forces may not be effectively applied to a collision object (opposing vehicle) from vehicle-width-direction outer parts of the bumper beam and the lower beam. Thus, the effect for reducing the possibility of damaging the collision object (opposing vehicle) may be decreased at the time of a frontal collision.

It is desirable to provide a vehicle front structure in which the possibility of damaging a collision object is reduced.

Hereinafter, a vehicle (automobile) "V" that employs a vehicle front structure "S" according to an embodiment of the disclosure will be described by using the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the drawings illustrate a vehicle front side, a vehicle upper side, and a vehicle left side (one side in the vehicle width direction) as viewed from above the vehicle, of the vehicle "V", by an arrow FR, an arrow UP, and an arrow LH, respectively. In addition, unless otherwise noted, the following descriptions using an upper-lower direction, a front-rear direction, and a right-left direction mean a vehicle upper-lower direction, a vehicle front-rear direction, and a vehicle right-left direction, respectively.

Figure 1:
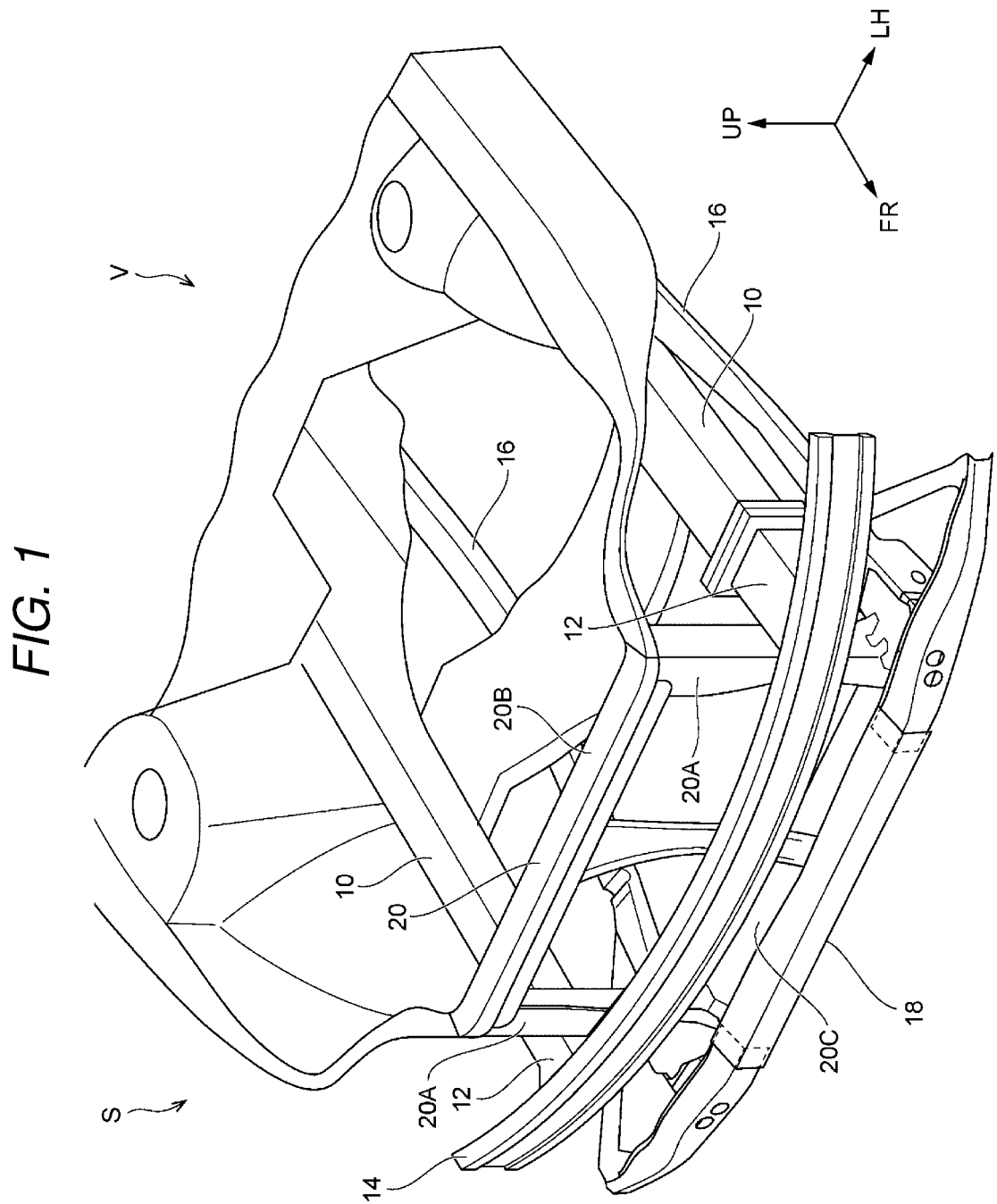
FIG. 1 is a perspective view as seen from a left oblique front side, schematically illustrating a front part of a vehicle that employs a vehicle front structure according to an embodiment of the disclosure.
Figure 2:
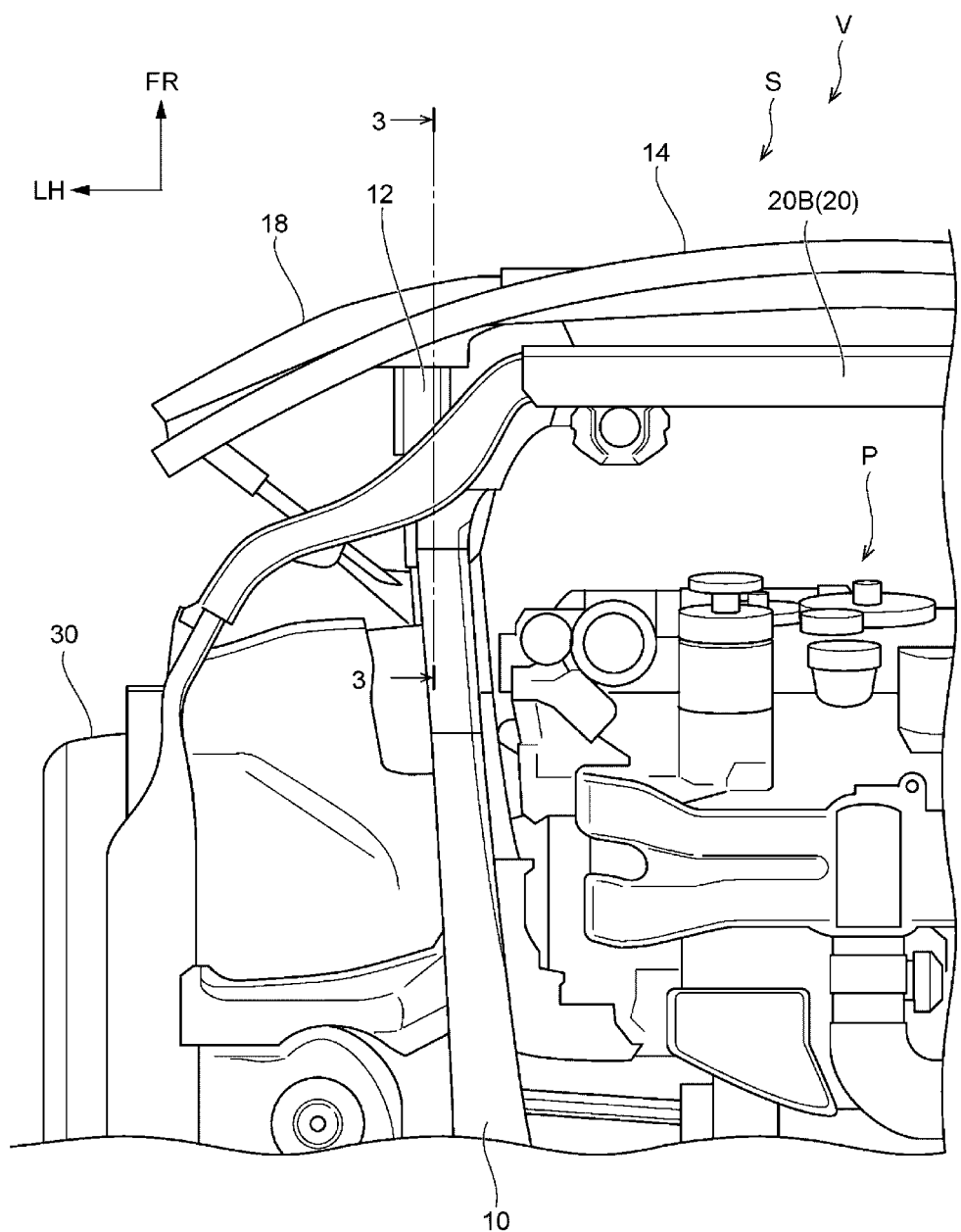
FIG. 2 is a top plan view illustrating a left front part of the vehicle in FIG. 1.
Figure 3:
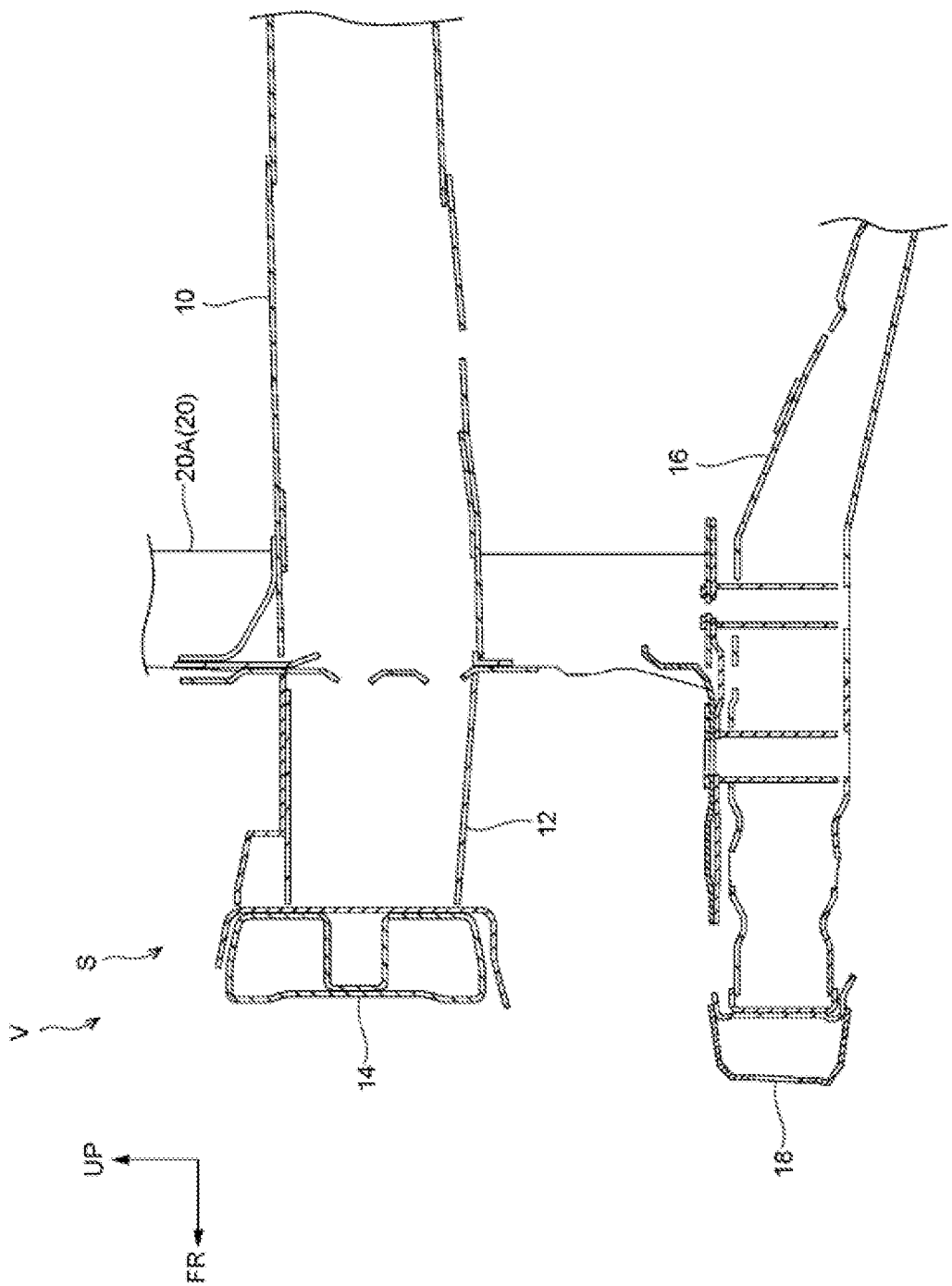
FIG. 3 is a sectional view (sectional view taken along a 3-3 line in FIG. 2) as seen from a left side, illustrating a bumper beam and a lower beam in FIG. 2.
Figure 4:
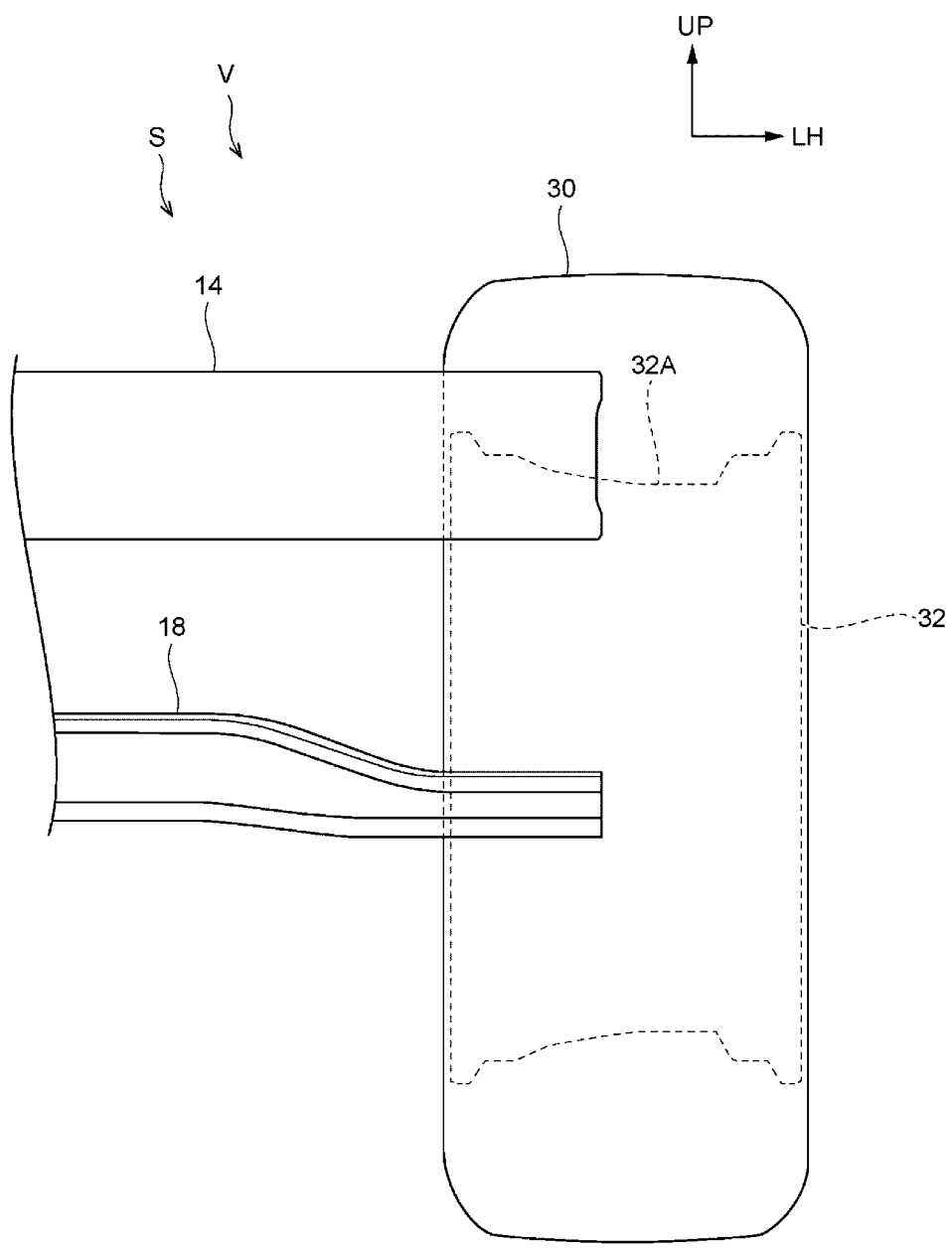
FIG. 4 is a front view illustrating positional relationships between vehicle-width-direction outer end parts of the bumper beam and the lower beam in FIG. 2 and a front wheel.
Figure 5:
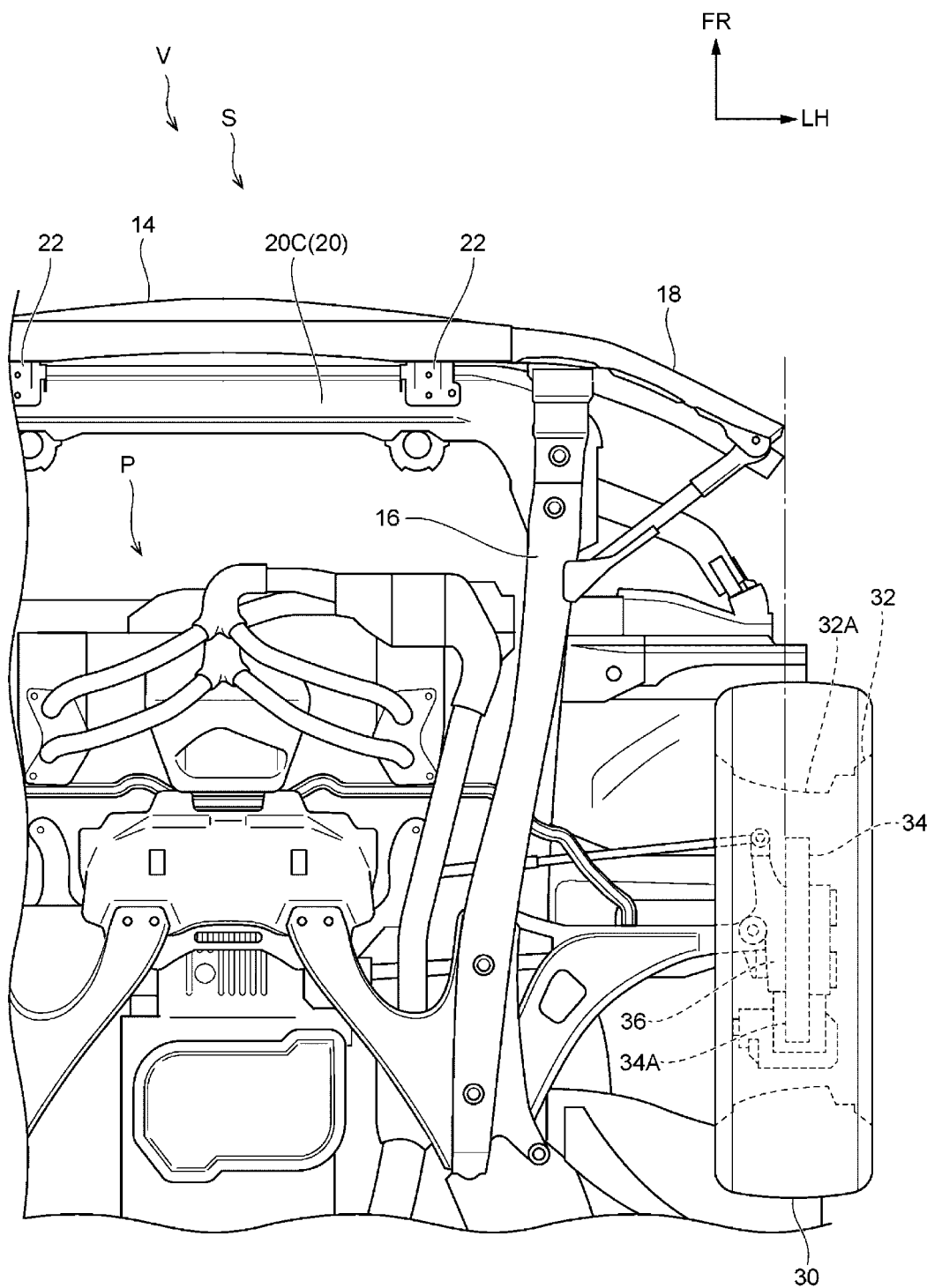
FIG. 5 is a bottom view illustrating positional relationships between the vehicle-width-direction outer end parts of the bumper beam and the lower beam in FIG. 2 and the front wheel.

As illustrated in FIGS. 1 to 5, the vehicle front structure "S" is employed at a front part of the vehicle "V". The vehicle front structure "S" includes a pair of side frames 10, a bumper beam 14, a pair of lower frames 16, and a lower beam 18.

The pair of the side frames 10 are formed into an approximately rectangular hollow pillar shape extending in the front-rear direction, and they are disposed on both sides in the vehicle width direction (both sides in the right-left direction) at the front part of the vehicle "V". The space between the pair of the side frames 10 is used as an engine room for housing a power unit "P" of the vehicle "V" (refer to FIGS. 2 and 5). A crash box 12 is provided in front of the side frame 10. The crash box 12 is formed into an approximately rectangular tube shape having an axial direction in the front-rear direction, and a rear end part of the crash box 12 is joined to a front end part of the side frame 10.

The bumper beam 14 is extended in the vehicle width direction and constitutes a frame of a front end part of the vehicle "V". A longitudinal direction of the bumper beam 14 is along with the vehicle width direction. The bumper beam 14 is formed into an approximately B shape in a left side sectional view of the bumper beam 14. Thus, the bumper beam 14 has a closed sectional structure with a pair of upper and lower rectangular closed cross sections (refer to FIG. 3). The bumper beam 14 is joined to front end parts of the crash boxes 12 in a state in which both of vehicle-width-direction outer end parts of the bumper beam 14 protrude outward in the vehicle width direction from the side frames 10. That is, the bumper beam 14 is indirectly coupled to the side frames 10 via the crash boxes 12. In another example, the bumper beam 14 may be directly coupled to the side frames 10 by omitting the crash boxes 12 and extending the front end parts of the side frames 10 forward of their positions of this embodiment. The bumper beam 14 is curved into an approximately circular arc shape so as to have a vehicle-width-direction center part being convex forward, in a plan view. That is, the bumper beam 14 is rearwardly inclined in a curve as it goes outward in the vehicle width direction, in a plan view.

The pair of the lower frames 16 are formed into an approximately rectangular hollow pillar shape extending in the front-rear direction, and they are disposed under the side frames 10. That is, the lower frames 16 are disposed on both sides in the vehicle width direction of the front part of the vehicle "V", under the side frames 10.

The lower beam 18 is disposed in front of the pair of the lower frames 16 and under the bumper beam 14, and it is extended in the vehicle width direction. A longitudinal direction of the lower beam 18 is along with the vehicle width direction. The lower beam 18, as well as the bumper beam 14, constitutes the frame of the front end part of the vehicle "V". The lower beam 18 is joined to front end parts of the lower frames 16 in a state in which both of vehicle-width-direction outer end parts of the lower beam 18 protrude outward in the vehicle width direction from the lower frames 16. The lower beam 18 has a rectangular closed sectional structure at both of vehicle-width-direction side parts and has an open sectional structure that opens rearward at a vehicle-width-direction center part. The cross sectional areas at the parts on the both sides in the vehicle width direction of the lower beam 18 are smaller than the cross sectional area of the bumper beam 14. That is, flexural rigidity of the lower beam 18 is set lower than that of the bumper beam 14.

The part that protrudes outward in the vehicle width direction from the lower frame 16 of the lower beam 18 is inclined rearward as it goes outward in the vehicle width direction, in a plan view. The position of a vehicle-width-direction outer end of the lower beam 18 substantially coincides with the position of a vehicle-width-direction outer end of the bumper beam 14, in the vehicle width direction. The vehicle-width-direction center part of the bumper beam 14 is disposed forward of the vehicle-width-direction center part of the lower beam 18. As described above, a vehicle-width-direction outer part of the lower beam 18 is inclined rearward as it goes outward in the vehicle width direction, in a plan view. Thus, the vehicle-width-direction center part of the bumper beam 14 is disposed forward of the whole lower beam 18. On the other hand, a vehicle-width-direction outer part (part protruding outward in the vehicle width direction from the side frame 10) of the bumper beam 14 is disposed rearward of the vehicle-width-direction outer part of the lower beam 18. That is, the inclination in the front-rear direction of the bumper beam 14 is set larger than that of the vehicle-width-direction outer part of the lower beam 18.

A radiator support 20 is provided between the pair of the side frames 10 and the pair of the lower frames 16. The radiator support 20 is formed into an approximately rectangular frame shape in a front view. The radiator support 20 is constructed as a support member for supporting a radiator (not illustrated) that is a constituent component of the vehicle "V". In one example, the radiator support 20 includes paired right and left radiator support side parts 20A, a radiator support upper part 20B, and a radiator support lower part 20C. The radiator support upper part 20B couples top end parts of the radiator support side parts 20A to each other. The radiator support lower part 20C couples bottom end parts of the radiator support side parts 20A to each other. The radiator support side part 20A is joined to the side frame 10. The radiator support lower part 20C is coupled to the lower beam 18 by paired right and left brackets 22 (refer to FIG. 5).

A front wheel 30 is provided on each outer side in the vehicle width direction of the side frame 10 and the lower frame 16. In one embodiment, the front wheel 30 may serve as a "wheel". A vehicle-width-direction outer end part of the lower beam 18 and a vehicle-width-direction outer end part of the bumper beam 14 are disposed forward of the front wheel 30. In one example, in a front view, a part (lower part) of the vehicle-width-direction outer end part of the bumper beam 14 and the vehicle-width-direction outer end part of the lower beam 18 are disposed at positions overlapping a wheel component 32 of the front wheel 30 (refer to FIG. 4). Here, an direction of the front wheel 30 is an direction of the front wheel 30 when the vehicle "V" travels straight. In addition, in the vehicle width direction, the position of the vehicle-width-direction outer end of each of the bumper beam 14 and the lower beam 18 substantially coincides with the position of a mounting part 34A of a brake device 34 that is disposed radially inside a rim 32A of the wheel component 32 (refer to FIG. 5). Here, an direction of the front wheel 30 is the direction of the front wheel 30 when the vehicle "V" travels straight. Herein, the brake device 34 is fastened to a housing 36 that is disposed radially inside the wheel component 32, and the mounting part 34A of the brake device 34 represents a mounting surface mounted to the housing 36 of the brake device 34. The mounting surface of the brake device 34 may be a mounting surface of a disc rotor of the brake device 34 or may be a mounting surface of a caliper of the brake device 34.

Next, functions and effects of this embodiment will be described.

At the time the vehicle "V" thus constructed has an offset frontal collision, a collision object collides with a vehicle-width-direction outer part at the front end part of the vehicle "V". In response to this, collision loads are applied rearward to the vehicle-width-direction outer parts of the bumper beam 14 and the lower beam 18, and the bumper beam 14 and the lower beam 18 are deformed in such a manner as to be displaced rearward. The vehicle-width-direction outer end part of the bumper beam 14 protrudes outward in the vehicle width direction from the side frame 10, and the vehicle-width-direction outer end part of the lower beam 18 protrudes outward in the vehicle width direction from the lower frame 16. With this structure, the vehicle-width-direction outer parts of the bumper beam 14 and the lower beam 18 are deformed in such a manner that the vehicle-width-direction outer ends of the bumper beam 14 and the lower beam 18 are displaced rearward and inward in the vehicle width direction.

Herein, each of the vehicle-width-direction outer end parts of the bumper beam 14 and a respective one of the vehicle-width-direction outer end parts of the lower beam 18 overlap (the wheel component 32 of) a respective one of the front wheels 30 in a front view. In addition, in the vehicle width direction, the position of each of the vehicle-width-direction outer ends of the bumper beam 14 and the position of a respective one of the vehicle-width-direction outer ends of the lower beam 18 coincide with the position of the mounting part 34A of a respective one of the brake devices 34, which are disposed radially inside the rim 32A of the wheel component 32 of a respective one of the front wheels 30. With this structure, at the time the vehicle "V" has an offset frontal collision, the vehicle-width-direction outer end parts of the bumper beam 14 and the lower beam 18 are displaced rearward to hit against the rim 32A of the wheel component 32 of the front wheel 30. This enables applying reaction forces to a collision object from the vehicle-width-direction outer parts of the bumper beam 14 and the lower beam 18. Thus, it is possible to reduce the possibility of damaging the collision object (opposing vehicle).

Details of this function are as follows. In general, the mounting part 34A of the brake device 34 is disposed proximate to a vehicle-width-direction center part of the front wheel 30. In this condition, if the vehicle-width-direction outer ends of the bumper beam 14 and the lower beam 18 are disposed inward in the vehicle width direction from the mounting part 34A of the brake device 34, the vehicle-width-direction outer ends of the bumper beam 14 and the lower beam 18 are disposed at a vehicle-width-direction inner part of the front wheel 30 in a front view. With this structure, at the time of an offset frontal collision, the vehicle-width-direction outer parts of the bumper beam 14 and the lower beam 18 may be displaced rearward and inward in the vehicle width direction, on the inner side in the vehicle width direction of the front wheel 30. In such a case, the vehicle-width-direction outer end parts of the bumper beam 14 and the lower beam 18 do not hit against the rim 32A of the wheel component 32. Thus, it is difficult to effectively apply reaction forces to a collision object from the vehicle-width-direction outer end parts of the bumper beam 14 and the lower beam 18. Alternatively, reaction forces are applied to a collision object mainly from the vehicle-width-direction center part (part in the vehicle width direction inward from the side frame 10) of the bumper beam 14 and the vehicle-width-direction center part (part in the vehicle width direction inward from the lower frame 16) of the lower beam 18. As a result, the reaction forces tend to be locally applied to the collision object, which may decrease the effect for reducing the possibility of damaging the collision object (opposing vehicle).

On the other hand, in this embodiment, the position of each of the vehicle-width-direction outer ends of the bumper beam 14 and the position of the respective one of the vehicle-width-direction outer ends of the lower beam 18 coincide with the position of the mounting part 34A of the respective one of the brake devices 34, in the vehicle width direction, as described above. In these conditions, the vehicle-width-direction outer ends of the bumper beam 14 and the lower beam 18 are disposed at an approximately center part in the vehicle width direction of the front wheel 30, in a front view. With this structure, at the time of an offset frontal collision, the vehicle-width-direction outer end parts of the bumper beam 14 and the lower beam 18 are displaced rearward and inward in the vehicle width direction to effectively hit against the rim 32A of the wheel component 32 of the front wheel 30. Thus, the front wheel 30 prevents rearward displacement of the vehicle-width-direction outer parts of the bumper beam 14 and the lower beam 18, whereby reaction forces are effectively applied to a collision object from the vehicle-width-direction outer parts of the bumper beam 14 and the lower beam 18. As a result, at the time of an offset frontal collision, while the bumper beam 14 and the lower beam 18 receive a collision object at their surfaces, reaction forces are applied to the collision object from the longitudinal direction of the bumper beam 14 and the lower beam 18. Thus, it is possible to reduce the possibility of damaging the collision object (opposing vehicle).

At the time of an offset frontal collision, the vehicle-width-direction outer end parts of the bumper beam 14 and the lower beam 18 hit against the rim 32A of the wheel component 32 of the front wheel 30, as described above, whereby turning of the front wheel 30 is prevented.

The lower beam 18 extends in the vehicle width direction under the bumper beam 14. With this structure, for example, at the time the vehicle "V" collides with a pedestrian, the lower beam 18 lifts up a leg of the pedestrian and makes the pedestrian ride on a hood at the front part of the vehicle "V". From this point of view, the lower beam 18 for improving a collision performance of the vehicle "V" can also be used as a member for lifting up a leg of a pedestrian at the time of a collision with the pedestrian. Thus, performance for protecting a pedestrian can be improved as well as the collision performance of the vehicle "V" is improved.

From the point of view of making the vehicle-width-direction outer end parts of the bumper beam 14 and the lower beam 18 hit against the rim 32A of the wheel component 32 of the front wheel 30 at the time of an offset frontal collision, the vehicle-width-direction outer ends of the bumper beam 14 and the lower beam 18 may be set at positions outward in the vehicle width direction from the mounting part 34A of the brake device 34. However, in this case, due to the vehicle-width-direction outer ends of the bumper beam 14 and the lower beam 18 being disposed at positions outward in the vehicle width direction from those of this embodiment, for example, the degree of freedom of design at corners of the front end part of the vehicle "V" may be reduced. On the other hand, in this embodiment, the position of each of the vehicle-width-direction outer ends of the bumper beam 14 and the position of the respective one of the vehicle-width-direction outer ends of the lower beam 18 coincide with the position of the mounting part 34A of the respective one of the brake devices 34, in the vehicle width direction, as described above. This prevents the vehicle-width-direction outer ends of the bumper beam 14 and the lower beam 18 from being disposed at positions in the vehicle width direction excessively outward of the vehicle "V". Thus, for example, the degree of freedom of design at corners of the front end part of the vehicle "V" can be increased.

The vehicle-width-direction center part of the bumper beam 14 is disposed forward of the vehicle-width-direction center part of the lower beam 18. The vehicle-width-direction outer end parts of the bumper beam 14 are disposed rearward of the vehicle-width-direction outer end parts of the lower beam 18. This structure makes the bumper beam 14 and the lower beam 18 further effectively receive a collision object by their surfaces at the time of an offset frontal collision.

Details of this function are as follows. The flexural rigidity of the lower beam 18 is set lower than that of the bumper beam 14 in the vehicle "V". In this condition, at the time of an offset frontal collision, upon the bumper beam 14 and the lower beam 18 receiving rearward collision loads at the vehicle-width-direction outer parts thereof, the lower beam 18 is deformed more than the bumper beam 14. For this reason, at the time of an offset frontal collision, the lower beam 18 may be displaced rearward of the bumper beam 14 relative to a collision object, and reaction forces may be applied to the collision object mainly from the bumper beam 14.

In this embodiment, as described above, the vehicle-width-direction center part of the bumper beam 14 is disposed forward of the vehicle-width-direction center part of the lower beam 18, and the vehicle-width-direction outer end parts of the bumper beam 14 are disposed rearward of the vehicle-width-direction outer end parts of the lower beam 18. With this structure, in an initial period of an offset frontal collision, a collision load is applied mainly to the bumper beam 14, which prevents rearward displacement of the lower beam 18. Then, after a collision object further advances toward the rear side and deforms the bumper beam 14 rearward, collision loads are applied to the bumper beam 14 and the lower beam 18. At this time, due to the vehicle-width-direction outer end part of the lower beam 18 disposed forward of the vehicle-width-direction outer end part of the bumper beam 14, even if the deformed amount of the lower beam 18 is greater than that of the bumper beam 14, both of the bumper beam 14 and the lower beam 18 are displaced rearward while receiving the collision object. In this manner, in this embodiment, at the time of an offset frontal collision, the timing the collision object hits against the bumper beam 14 and the timing the collision object hits against the lower beam 18 are shifted from each other in the vehicle width direction. As a result, the bumper beam 14 and the lower beam 18 further effectively receive the collision object by their surfaces. Thus, it is possible to effectively reduce the possibility of damaging the collision object (opposing vehicle).

In this embodiment, the vehicle-width-direction outer end part of the bumper beam 14 is disposed in such a manner that a part thereof overlaps the wheel component 32 of the front wheel 30 in a front view. However, the vehicle-width-direction outer end part of the bumper beam 14 may be disposed in such a manner that the whole thereof overlaps the wheel component 32 in accordance with the type of vehicle.

The invention claimed is:

1. A vehicle front structure comprising:
    side frames in pairs disposed respectively on both sides of a front part of a vehicle in a vehicle width direction of the vehicle, the side frames extending in a vehicle front-rear direction of the vehicle;
    a bumper beam extending in the vehicle width direction, the bumper beam being coupled to respective vehicle front end parts of the side frames, both outer end parts of the bumper beam in the vehicle width direction being disposed outward in the vehicle width direction as seen from the side frames;
    lower frames in pairs extending in the vehicle front-rear direction on the both sides of the front part in the vehicle width direction, the lower frames being disposed under the side frames;
    a lower beam extending in the vehicle width direction on a vehicle lower side of the bumper beam, the lower beam being coupled to respective front end parts of the lower frames, both outer end parts of the lower beam in the vehicle width direction being disposed outward in the vehicle width direction as seen from the lower frames; and
    wheels in pairs disposed on an outer side of the side frames in the vehicle width direction and an outer side of the lower frames in the vehicle width direction, wherein
    each of the outer end parts of the bumper beam and a corresponding one of the outer end parts of the lower beam are disposed on a vehicle front side of a corresponding one of the wheels and overlap the corresponding one of the wheels as seen from the vehicle front side, and
    in the vehicle width direction, a position of each of vehicle-width-direction outer ends of the bumper beam and a position of a corresponding one of vehicle-width-direction outer ends of the lower beam coincide with a position of a mounting part of a corresponding one of brake devices that are disposed radially inside the wheels respectively.

2. The vehicle front structure according to claim 1, wherein
    a center part of the bumper beam in the vehicle width direction is disposed on the vehicle front side as seen from a center part of the lower beam in the vehicle width direction, and
    the outer end parts of the bumper beam are disposed toward a vehicle rear side as seen from the outer end parts of the lower beam.

3. The vehicle front structure according to claim 2, wherein the center part of the bumper beam is disposed forward of the center part of the lower beam in a wheel width direction,
    wherein the outer end parts of the bumper beam are disposed rearward of the outer end parts of the lower beam in the vehicle-width-direction.

4. The vehicle front structure according to claim 1, wherein in a vehicle-width-direction, outer end parts of the bumper beam and the lower beam are disposed at an approximately center part in the vehicle width direction of a front wheel from among the wheels.

5. The vehicle front structure according to claim 1, wherein in a vehicle-width-direction, the outer end parts of the bumper beam and the lower beam are capable of being displaced rearward to hit against a rim of a wheel component of the wheels.

6. The vehicle front structure according to claim 1, wherein the bumper beam is formed into a closed sectional structure in a left side sectional view of the bumper beam, the closed sectional structure includes a pair of upper and lower rectangular closed cross sections.

7. The vehicle front structure according to claim 1, wherein the bumper beam is curved into an approximately circular arc shape so as to have a vehicle-width-direction center part being convex forward, in a plan view, where the bumper beam is rearwardly inclined in a curve as it goes outward in the vehicle width direction, in a plan view.

8. The vehicle front structure according to claim 1, wherein the lower beam is joined to the respective front end parts of the lower frames in a state in which both of the outer end parts of the lower beam protrude outward in the vehicle width direction from the lower frames, and
wherein the lower beam comprises a rectangular closed sectional structure at both of vehicle-width-direction side parts and has an open sectional structure that opens rearward at a vehicle-width-direction center part.

9. The vehicle front structure according to claim 8,
wherein cross-sectional areas at parts on the both sides in the vehicle width direction of the lower beam are less than a cross sectional area of the bumper beam, and
wherein a flexural rigidity of the lower beam is set lower than that of the bumper beam.

10. The vehicle front structure according to claim 1, wherein a part that protrudes outward in the vehicle width direction from the lower frames of the lower beam is inclined rearward as it goes outward in the vehicle width direction, in a plan view.

11. The vehicle front structure according to claim 1, wherein a position of the outer end parts of the lower beam coincides with the position of the outer end parts of the bumper beam, in the vehicle width direction,
wherein a center part of the bumper beam is disposed forward of a center part of the lower beam in the vehicle-width-direction, and
wherein the outer end parts of the lower beam is inclined rearward as it goes outward in the vehicle width direction, in a plan view.

12. The vehicle front structure according to claim 11,
wherein the center part of the bumper beam is disposed forward of a whole of the lower beam,
wherein the outer end parts of the bumper beam that is protruding outward in the vehicle width direction from the side frames of the bumper beam is disposed rearward of the outer end part of the lower beam, and
wherein an inclination in a front-rear direction of the bumper beam is set greater than that of the outer end parts of the lower beam in the vehicle-width-direction.

13. The vehicle front structure according to claim 1,
wherein the outer end part of the lower beam and the outer end part of the bumper beam are disposed forward of the wheels, and
wherein in a front view, a lower part of the outer end part of the bumper beam and the outer end part of the lower beam are disposed at positions overlapping a wheel component the wheels.

14. The vehicle front structure according to claim 13,
wherein the outer end part of the bumper beam protrudes outward in the vehicle width direction from the side frames, and the outer end part of the lower beam protrudes outward in the vehicle width direction from the lower frame, and
wherein the outer end parts of the bumper beam and the lower beam are capable of being deformed in such that the outer end parts of the bumper beam and the lower beam are displaced rearward and inward in the vehicle width direction.

15. The vehicle front structure according to claim 1, wherein, each of the outer end parts of the bumper beam and a respective one of the outer end parts of the lower beam overlap a wheel component a respective one of the wheels in a front view in the vehicle-width-direction,
wherein the mounting part of the corresponding one of brake devices is disposed proximate to a center part of a front wheel from among the wheels in the vehicle-width-direction, and
wherein the outer end parts of the bumper beam and the lower beam are disposed inward in the vehicle width direction from the mounting part of the respective brake devices, the outer end parts of the bumper beam and the lower beam are disposed at a vehicle-width-direction inner part of the wheels in a front view.

16. The vehicle front structure according to claim 1, wherein the outer end parts of the bumper beam and the lower beam are disposed at an approximately center part in the vehicle width direction of the wheels, in a front view, such that the outer end parts of the bumper beam and the lower beam are capable of being displaced rearward and inward in the vehicle width direction to effectively hit against a rim of a wheel component of the wheels to prevent a rearward displacement of the outer end parts of the bumper beam and the lower beam and prevent a turning of a front wheel from among the wheels.

17. The vehicle front structure according to claim 1, wherein the lower beam extends in the vehicle width direction under the bumper beam.

18. A vehicle, comprising:
a vehicle front structure comprising:
side frames in pairs disposed respectively on both sides of a front part of a vehicle in a vehicle width direction of the vehicle, the side frames extending in a vehicle front-rear direction of the vehicle;
a bumper beam extending in the vehicle width direction, the bumper beam being coupled to respective vehicle front end parts of the side frames, both outer end parts of the bumper beam in the vehicle width direction being disposed outward in the vehicle width direction as seen from the side frames;
lower frames in pairs extending in the vehicle front-rear direction on the both sides of the front part in the vehicle width direction, the lower frames being disposed under the side frames;
a lower beam extending in the vehicle width direction on a vehicle lower side of the bumper beam, the lower beam being coupled to respective front end parts of the lower frames, both outer end parts of the lower beam in the vehicle width direction being disposed outward in the vehicle width direction as seen from the lower frames; and
wheels in pairs disposed on an outer side of the side frames in the vehicle width direction and an outer side of the lower frames in the vehicle width direction, wherein
each of the outer end parts of the bumper beam and a corresponding one of the outer end parts of the lower beam are disposed on a vehicle front side of a corresponding one of the wheels and overlap the corresponding one of the wheels as seen from the vehicle front side, and
in the vehicle width direction, a position of each of vehicle-width-direction outer ends of the bumper beam and a position of a corresponding one of vehicle-width-direction outer ends of the lower beam coincide with a position of a mounting part of a corresponding one of brake devices that are disposed radially inside the wheels respectively.

19. The vehicle according to claim 18, wherein
a center part of the bumper beam in the vehicle width direction is disposed on the vehicle front side as seen from a center part of the lower beam in the vehicle width direction, and
the outer end parts of the bumper beam are disposed toward a vehicle rear side as seen from the outer end parts of the lower beam.

20. The vehicle according to claim 18, wherein in a vehicle-width-direction, outer end parts of the bumper beam and the lower beam are disposed at an approximately a center part in the vehicle width direction of a front wheel from among the wheels,
wherein a part that protrudes outward in the vehicle width direction from the lower frame of the lower beam is inclined rearward as it goes outward in the vehicle width direction, in a plan view,
wherein the center part of the bumper beam is disposed forward of a center part of the lower beam in the vehicle-width-direction,
wherein the end outer parts of the lower beam is inclined rearward as it goes outward in the vehicle width direction, in a plan view, and
wherein in a vehicle-width-direction, the outer end parts of the bumper beam and the lower beam are capable of being displaced rearward to hit against a rim of a wheel component of the wheels.

* * * * *